United States Patent
Pignataro et al.

(10) Patent No.: US 10,791,065 B2
(45) Date of Patent: Sep. 29, 2020

(54) SYSTEMS AND METHODS FOR PROVIDING CONTAINER ATTRIBUTES AS PART OF OAM TECHNIQUES

(71) Applicant: Cisco Technology, Inc., San Jose, CA (US)

(72) Inventors: Carlos M. Pignataro, Cary, NC (US); Nagendra Kumar Nainar, Morrisville, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/709,349

(22) Filed: Sep. 19, 2017

(65) Prior Publication Data
US 2019/0089651 A1    Mar. 21, 2019

(51) Int. Cl.
| | | |
|---|---|---|
| G06F 9/50 | (2006.01) | |
| H04L 12/935 | (2013.01) | |
| H04W 16/02 | (2009.01) | |
| H04L 12/927 | (2013.01) | |
| H04L 12/741 | (2013.01) | |

(52) U.S. Cl.
CPC .......... H04L 49/3009 (2013.01); H04L 45/74 (2013.01)

(58) Field of Classification Search
CPC ..... H04L 41/0893; H04L 45/00; H04L 45/74; H04L 45/22
USPC ...................................................... 370/235
See application file for complete search history.

(56) References Cited

U.S. PATENT DOCUMENTS

| | | |
|---|---|---|
| 3,629,512 A | 12/1971 | Yuan |
| 4,769,811 A | 9/1988 | Eckberg, Jr. et al. |
| 5,408,231 A | 4/1995 | Bowdon |
| 5,491,690 A | 2/1996 | Alfonsi et al. |

(Continued)

FOREIGN PATENT DOCUMENTS

| | | |
|---|---|---|
| CN | 103716123 | 4/2014 |
| CN | 103716137 | 4/2014 |

(Continued)

OTHER PUBLICATIONS

3GPP TR 23.401 V9.5.0 (Jun. 2010) Technical Specification: Group Services and Systems Aspects; General Packet Radio Service (GPRS) Enhancements for Evolved Universal Terrestrial Radio Access Network (E-UTRAN) Access (Release 9), 3rd Generation Partnership Project (3GPP), 650 Route des Lucioles—Sophia Antipolis Valbonne—France, Jun. 2010; 259 pages.

(Continued)

*Primary Examiner* — Khaled M Kassim
*Assistant Examiner* — Jason A Harley
(74) *Attorney, Agent, or Firm* — Polsinelli PC

(57) ABSTRACT

Systems, methods, and computer-readable media for providing container specific information as part of in-situ OAM, SRH or NSH of a data packet in order to provide a more holistic overview of a path traversed by a data packet in a network. In one aspect of the present disclosure, a method of providing container specific information includes receiving a data packet at a corresponding container; determining identification information of the corresponding container; modifying the data packet to include the container specific information to yield a modified data packet; and forwarding the modified data packet to a next destination based on destination information included in the data packet.

15 Claims, 7 Drawing Sheets

(56) References Cited

U.S. PATENT DOCUMENTS

| | | |
|---|---|---|
| 5,557,609 A | 9/1996 | Shobatake et al. |
| 5,600,638 A | 2/1997 | Bertin et al. |
| 5,687,167 A | 11/1997 | Bertin et al. |
| 6,115,384 A | 9/2000 | Parzych |
| 6,167,438 A | 12/2000 | Yates et al. |
| 6,400,681 B1 | 6/2002 | Bertin et al. |
| 6,661,797 B1 | 12/2003 | Goel et al. |
| 6,687,229 B1 | 2/2004 | Kataria et al. |
| 6,799,270 B1 | 9/2004 | Bull et al. |
| 6,888,828 B1 | 5/2005 | Partanen et al. |
| 6,993,593 B2 | 1/2006 | Iwata |
| 7,027,408 B2 | 4/2006 | Nabkel et al. |
| 7,062,567 B2 | 6/2006 | Benitez et al. |
| 7,095,715 B2 | 8/2006 | Buckman et al. |
| 7,096,212 B2 | 8/2006 | Tribble et al. |
| 7,139,239 B2 | 11/2006 | Mcfarland et al. |
| 7,165,107 B2 | 1/2007 | Pouyoul et al. |
| 7,197,008 B1 | 3/2007 | Shabtay et al. |
| 7,197,660 B1 | 3/2007 | Liu et al. |
| 7,209,435 B1 | 4/2007 | Kuo et al. |
| 7,227,872 B1 | 6/2007 | Biswas et al. |
| 7,231,462 B2 | 6/2007 | Berthaud et al. |
| 7,333,990 B1 | 2/2008 | Thiagarajan et al. |
| 7,443,796 B1 | 10/2008 | Albert et al. |
| 7,458,084 B2 | 11/2008 | Zhang et al. |
| 7,472,411 B2 | 12/2008 | Wing et al. |
| 7,486,622 B2 | 2/2009 | Regan et al. |
| 7,536,396 B2 | 5/2009 | Johnson et al. |
| 7,552,201 B2 | 6/2009 | Areddu et al. |
| 7,558,261 B2 | 7/2009 | Arregoces et al. |
| 7,567,504 B2 | 7/2009 | Darling et al. |
| 7,571,470 B2 | 8/2009 | Arregoces et al. |
| 7,573,879 B2 | 8/2009 | Narad et al. |
| 7,610,375 B2 | 10/2009 | Portolani et al. |
| 7,643,468 B1 | 1/2010 | Arregoces et al. |
| 7,644,182 B2 | 1/2010 | Banerjee et al. |
| 7,647,422 B2 | 1/2010 | Singh et al. |
| 7,657,898 B2 | 2/2010 | Sadiq |
| 7,657,940 B2 | 2/2010 | Portolani et al. |
| 7,668,116 B2 | 2/2010 | Wijnands et al. |
| 7,684,321 B2 | 3/2010 | Muirhead et al. |
| 7,738,469 B1 | 6/2010 | Shekokar et al. |
| 7,751,409 B1 | 7/2010 | Carolan |
| 7,793,157 B2 | 9/2010 | Bailey et al. |
| 7,814,284 B1 | 10/2010 | Glass et al. |
| 7,831,693 B2 | 11/2010 | Lai |
| 7,852,785 B2 | 12/2010 | Lund et al. |
| 7,860,095 B2 | 12/2010 | Forissier et al. |
| 7,860,100 B2 | 12/2010 | Khalid et al. |
| 7,895,425 B2 | 2/2011 | Khalid et al. |
| 7,899,012 B2 | 3/2011 | Ho et al. |
| 7,899,861 B2 | 3/2011 | Feblowitz et al. |
| 7,907,595 B2 | 3/2011 | Khanna et al. |
| 7,908,480 B2 | 3/2011 | Firestone et al. |
| 7,983,174 B1 | 7/2011 | Monaghan et al. |
| 7,990,847 B1 | 8/2011 | Leroy et al. |
| 8,000,329 B2 | 8/2011 | Fendick et al. |
| 8,018,938 B1 | 9/2011 | Fromm et al. |
| 8,094,575 B1 | 1/2012 | Vadlakonda et al. |
| 8,095,683 B2 | 1/2012 | Balasubramaniam Chandra |
| 8,116,307 B1 | 2/2012 | Thesayi et al. |
| 8,166,465 B2 | 4/2012 | Feblowitz et al. |
| 8,180,909 B2 | 5/2012 | Hartman et al. |
| 8,191,119 B2 | 5/2012 | Wing et al. |
| 8,195,774 B2 | 6/2012 | Lambeth et al. |
| 8,280,354 B2 | 10/2012 | Smith et al. |
| 8,281,302 B2 | 10/2012 | Durazzo et al. |
| 8,291,108 B2 | 10/2012 | Raja et al. |
| 8,305,900 B2 | 11/2012 | Bianconi |
| 8,311,045 B2 | 11/2012 | Quinn et al. |
| 8,316,457 B1 | 11/2012 | Paczkowski et al. |
| 8,355,332 B2 | 1/2013 | Beaudette et al. |
| 8,442,043 B2 | 5/2013 | Sharma et al. |
| 8,451,817 B2 | 5/2013 | Cheriton |
| 8,464,336 B2 | 6/2013 | Wei et al. |
| 8,473,981 B1 | 6/2013 | Gargi |
| 8,479,298 B2 | 7/2013 | Keith et al. |
| 8,498,414 B2 | 7/2013 | Rossi |
| 8,520,672 B2 | 8/2013 | Guichard et al. |
| 8,601,152 B1 | 12/2013 | Chou |
| 8,605,588 B2 | 12/2013 | Sankaran et al. |
| 8,612,612 B1 | 12/2013 | Dukes et al. |
| 8,627,328 B2 | 1/2014 | Mousseau et al. |
| 8,645,952 B2 | 2/2014 | Biswas et al. |
| 8,676,965 B2 | 3/2014 | Gueta |
| 8,676,980 B2 | 3/2014 | Kreeger et al. |
| 8,700,892 B2 | 4/2014 | Bollay et al. |
| 8,724,466 B2 | 5/2014 | Kenigsberg et al. |
| 8,730,980 B2 | 5/2014 | Bagepalli et al. |
| 8,743,885 B2 | 6/2014 | Khan et al. |
| 8,751,420 B2 | 6/2014 | Hjelm et al. |
| 8,762,534 B1 | 6/2014 | Hong et al. |
| 8,762,707 B2 | 6/2014 | Killian et al. |
| 8,792,490 B2 | 7/2014 | Jabr et al. |
| 8,793,400 B2 | 7/2014 | Mcdysan et al. |
| 8,812,730 B2 | 8/2014 | Vos et al. |
| 8,819,419 B2 | 8/2014 | Carlson et al. |
| 8,825,070 B2 | 9/2014 | Akhtar et al. |
| 8,830,834 B2 | 9/2014 | Sharma et al. |
| 8,904,037 B2 | 12/2014 | Haggar et al. |
| 8,984,284 B2 | 3/2015 | Purdy, Sr. et al. |
| 9,001,827 B2 | 4/2015 | Appenzeller |
| 9,071,533 B2 | 6/2015 | Hui et al. |
| 9,077,661 B2 | 7/2015 | Andreasen et al. |
| 9,088,584 B2 | 7/2015 | Feng et al. |
| 9,130,872 B2 | 9/2015 | Kumar et al. |
| 9,143,438 B2 | 9/2015 | Khan et al. |
| 9,160,797 B2 | 10/2015 | Mcdysan |
| 9,178,812 B2 | 11/2015 | Guichard et al. |
| 9,189,285 B2 | 11/2015 | Ng et al. |
| 9,203,711 B2 | 12/2015 | Agarwal et al. |
| 9,253,274 B2 | 2/2016 | Quinn et al. |
| 9,300,579 B2 | 3/2016 | Frost et al. |
| 9,300,585 B2 | 3/2016 | Kumar et al. |
| 9,311,130 B2 | 4/2016 | Christenson et al. |
| 9,319,324 B2 | 4/2016 | Beheshti-Zavareh et al. |
| 9,325,565 B2 | 4/2016 | Yao et al. |
| 9,338,097 B2 | 5/2016 | Anand et al. |
| 9,344,337 B2 | 5/2016 | Kumar et al. |
| 9,374,297 B2 | 6/2016 | Bosch et al. |
| 9,379,931 B2 | 6/2016 | Bosch et al. |
| 9,385,950 B2 | 7/2016 | Quinn et al. |
| 9,398,486 B2 | 7/2016 | La Roche, Jr. et al. |
| 9,407,540 B2 | 8/2016 | Kumar et al. |
| 9,413,655 B2 | 8/2016 | Shatzkamer et al. |
| 9,424,065 B2 | 8/2016 | Singh et al. |
| 9,436,443 B2 | 9/2016 | Chiosi et al. |
| 9,444,675 B2 | 9/2016 | Guichard et al. |
| 9,473,570 B2 | 10/2016 | Bhanujan et al. |
| 9,479,443 B2 | 10/2016 | Bosch et al. |
| 9,491,094 B2 | 11/2016 | Patwardhan et al. |
| 9,537,836 B2 | 1/2017 | Maller et al. |
| 9,558,029 B2 | 1/2017 | Behera et al. |
| 9,559,970 B2 | 1/2017 | Kumar et al. |
| 9,571,405 B2 | 2/2017 | Pignataro et al. |
| 9,608,896 B2 | 3/2017 | Kumar et al. |
| 9,614,739 B2 | 4/2017 | Kumar et al. |
| 9,660,909 B2 | 5/2017 | Guichard et al. |
| 9,723,106 B2 | 8/2017 | Shen et al. |
| 9,774,533 B2 | 9/2017 | Zhang et al. |
| 9,794,379 B2 | 10/2017 | Kumar et al. |
| 9,882,776 B2 | 1/2018 | Aybay et al. |
| 9,929,945 B2 | 3/2018 | Schultz et al. |
| 10,003,530 B2 | 6/2018 | Zhang et al. |
| 2001/0023442 A1 | 9/2001 | Masters |
| 2002/0085562 A1 | 7/2002 | Hufferd et al. |
| 2002/0131362 A1 | 9/2002 | Callon |
| 2002/0156893 A1 | 10/2002 | Pouyoul et al. |
| 2002/0167935 A1 | 11/2002 | Nabkel et al. |
| 2003/0023879 A1 | 1/2003 | Wray |
| 2003/0026257 A1 | 2/2003 | Xu et al. |
| 2003/0037070 A1 | 2/2003 | Marston |
| 2003/0088698 A1 | 5/2003 | Singh et al. |
| 2003/0110081 A1 | 6/2003 | Tosaki et al. |

(56) References Cited

U.S. PATENT DOCUMENTS

| | | |
|---|---|---|
| 2003/0120816 A1 | 6/2003 | Berthaud et al. |
| 2003/0214913 A1 | 11/2003 | Kan et al. |
| 2003/0226142 A1 | 12/2003 | Rand |
| 2004/0109412 A1 | 6/2004 | Hansson et al. |
| 2004/0148391 A1 | 7/2004 | Shannon, Sr. et al. |
| 2004/0199812 A1 | 10/2004 | Earl |
| 2004/0213160 A1 | 10/2004 | Regan et al. |
| 2004/0264481 A1 | 12/2004 | Darling et al. |
| 2004/0268357 A1 | 12/2004 | Joy et al. |
| 2005/0044197 A1 | 2/2005 | Lai |
| 2005/0058118 A1 | 3/2005 | Davis |
| 2005/0060572 A1 | 3/2005 | Kung |
| 2005/0086367 A1 | 4/2005 | Conta et al. |
| 2005/0120101 A1 | 6/2005 | Nocera |
| 2005/0152378 A1 | 7/2005 | Bango et al. |
| 2005/0157645 A1 | 7/2005 | Rabie et al. |
| 2005/0160180 A1 | 7/2005 | Rabje et al. |
| 2005/0204042 A1 | 9/2005 | Banerjee et al. |
| 2005/0210096 A1 | 9/2005 | Bishop et al. |
| 2005/0257002 A1 | 11/2005 | Nguyen |
| 2005/0281257 A1 | 12/2005 | Yazaki et al. |
| 2005/0286540 A1 | 12/2005 | Hurtta et al. |
| 2005/0289244 A1 | 12/2005 | Sahu et al. |
| 2006/0005240 A1 | 1/2006 | Sundarrajan et al. |
| 2006/0031374 A1 | 2/2006 | Lu et al. |
| 2006/0045024 A1 | 3/2006 | Previdi et al. |
| 2006/0074502 A1 | 4/2006 | Mcfarland |
| 2006/0092950 A1 | 5/2006 | Arregoces et al. |
| 2006/0095960 A1 | 5/2006 | Arregoces et al. |
| 2006/0112400 A1 | 5/2006 | Zhang et al. |
| 2006/0155862 A1 | 7/2006 | Kathi et al. |
| 2006/0168223 A1 | 7/2006 | Mishra et al. |
| 2006/0233106 A1 | 10/2006 | Achlioptas et al. |
| 2006/0233155 A1 | 10/2006 | Srivastava |
| 2007/0061441 A1 | 3/2007 | Landis et al. |
| 2007/0067435 A1 | 3/2007 | Landis et al. |
| 2007/0076767 A1* | 4/2007 | Loprieno .......... H04J 3/076 370/539 |
| 2007/0094397 A1 | 4/2007 | Krelbaum et al. |
| 2007/0143851 A1 | 6/2007 | Nicodemus et al. |
| 2007/0237147 A1 | 10/2007 | Quinn et al. |
| 2007/0250836 A1 | 10/2007 | Li et al. |
| 2008/0056153 A1 | 3/2008 | Liu |
| 2008/0075113 A1* | 3/2008 | Harley .......... H04J 3/07 370/466 |
| 2008/0080509 A1 | 4/2008 | Khanna et al. |
| 2008/0080517 A1 | 4/2008 | Roy et al. |
| 2008/0170542 A1 | 7/2008 | Hu |
| 2008/0177896 A1 | 7/2008 | Quinn et al. |
| 2008/0181118 A1 | 7/2008 | Sharma et al. |
| 2008/0196083 A1 | 8/2008 | Parks et al. |
| 2008/0209039 A1 | 8/2008 | Tracey et al. |
| 2008/0219287 A1 | 9/2008 | Krueger et al. |
| 2008/0225710 A1 | 9/2008 | Raja et al. |
| 2008/0291910 A1 | 11/2008 | Tadimeti et al. |
| 2009/0003364 A1 | 1/2009 | Fendick et al. |
| 2009/0006152 A1 | 1/2009 | Timmerman et al. |
| 2009/0037713 A1 | 2/2009 | Khalid et al. |
| 2009/0094684 A1 | 4/2009 | Chinnusamy et al. |
| 2009/0204612 A1 | 8/2009 | Keshavarz-nia et al. |
| 2009/0271656 A1 | 10/2009 | Yokota et al. |
| 2009/0300207 A1 | 12/2009 | Giaretta et al. |
| 2009/0305699 A1 | 12/2009 | Deshpande et al. |
| 2009/0328054 A1 | 12/2009 | Paramasivam et al. |
| 2010/0058329 A1 | 3/2010 | Durazzo et al. |
| 2010/0063988 A1 | 3/2010 | Khalid |
| 2010/0080226 A1 | 4/2010 | Khalid |
| 2010/0165985 A1 | 7/2010 | Sharma et al. |
| 2010/0191612 A1 | 7/2010 | Raleigh |
| 2010/0211658 A1 | 8/2010 | Hoogerwerf et al. |
| 2011/0023090 A1 | 1/2011 | Asati et al. |
| 2011/0032833 A1 | 2/2011 | Zhang et al. |
| 2011/0055845 A1 | 3/2011 | Nandagopal et al. |
| 2011/0131338 A1 | 6/2011 | Hu |
| 2011/0137991 A1 | 6/2011 | Russell et al. |
| 2011/0142056 A1 | 6/2011 | Manoj |
| 2011/0161494 A1 | 6/2011 | Mcdysan et al. |
| 2011/0222412 A1 | 9/2011 | Kompella |
| 2011/0255538 A1 | 10/2011 | Srinivasan et al. |
| 2011/0267947 A1 | 11/2011 | Dhar et al. |
| 2012/0131662 A1 | 5/2012 | Kuik et al. |
| 2012/0147894 A1 | 6/2012 | Mulligan et al. |
| 2012/0324442 A1 | 12/2012 | Barde |
| 2012/0331135 A1 | 12/2012 | Alon et al. |
| 2013/0003735 A1 | 1/2013 | Chao et al. |
| 2013/0003736 A1 | 1/2013 | Szyszko et al. |
| 2013/0040640 A1 | 2/2013 | Chen et al. |
| 2013/0044636 A1 | 2/2013 | Koponen et al. |
| 2013/0121137 A1 | 5/2013 | Feng et al. |
| 2013/0124708 A1 | 5/2013 | Lee et al. |
| 2013/0163594 A1 | 6/2013 | Sharma et al. |
| 2013/0163606 A1 | 6/2013 | Bagepalli et al. |
| 2013/0238806 A1 | 9/2013 | Moen |
| 2013/0272305 A1 | 10/2013 | Lefebvre et al. |
| 2013/0311675 A1 | 11/2013 | Kancherla |
| 2013/0329584 A1 | 12/2013 | Ghose et al. |
| 2014/0010083 A1 | 1/2014 | Hamdi et al. |
| 2014/0010096 A1 | 1/2014 | Kamble et al. |
| 2014/0036730 A1 | 2/2014 | Nellikar et al. |
| 2014/0050223 A1 | 2/2014 | Foo et al. |
| 2014/0067758 A1 | 3/2014 | Boldyrev et al. |
| 2014/0105062 A1 | 4/2014 | McDysan et al. |
| 2014/0181267 A1 | 6/2014 | Wadkins et al. |
| 2014/0254603 A1 | 9/2014 | Banavalikar et al. |
| 2014/0259012 A1 | 9/2014 | Nandlall et al. |
| 2014/0279863 A1 | 9/2014 | Krishnamurthy et al. |
| 2014/0280836 A1 | 9/2014 | Kumar et al. |
| 2014/0317261 A1 | 10/2014 | Shatzkamer et al. |
| 2014/0321459 A1 | 10/2014 | Kumar et al. |
| 2014/0334295 A1 | 11/2014 | Guichard et al. |
| 2014/0344439 A1 | 11/2014 | Kempf et al. |
| 2014/0362682 A1 | 12/2014 | Guichard et al. |
| 2014/0362857 A1 | 12/2014 | Guichard et al. |
| 2014/0369209 A1 | 12/2014 | Khurshid et al. |
| 2014/0376558 A1 | 12/2014 | Rao et al. |
| 2015/0003455 A1 | 1/2015 | Haddad et al. |
| 2015/0012584 A1 | 1/2015 | Lo et al. |
| 2015/0012988 A1 | 1/2015 | Jeng et al. |
| 2015/0029871 A1 | 1/2015 | Frost et al. |
| 2015/0032871 A1 | 1/2015 | Allan et al. |
| 2015/0052516 A1 | 2/2015 | French et al. |
| 2015/0071285 A1 | 3/2015 | Kumar et al. |
| 2015/0074276 A1 | 3/2015 | DeCusatis et al. |
| 2015/0082308 A1 | 3/2015 | Kiess et al. |
| 2015/0085635 A1 | 3/2015 | Wijnands et al. |
| 2015/0085870 A1 | 3/2015 | Narasimha et al. |
| 2015/0089082 A1 | 3/2015 | Patwardhan et al. |
| 2015/0092564 A1 | 4/2015 | Aldrin |
| 2015/0103827 A1 | 4/2015 | Quinn et al. |
| 2015/0117308 A1 | 4/2015 | Kant |
| 2015/0124622 A1 | 5/2015 | Kovvali et al. |
| 2015/0124817 A1* | 5/2015 | Merchant .......... H04L 45/74 370/392 |
| 2015/0131484 A1 | 5/2015 | Aldrin |
| 2015/0131660 A1 | 5/2015 | Shepherd et al. |
| 2015/0150003 A1* | 5/2015 | Emelyanov .......... G06F 9/455 718/1 |
| 2015/0156035 A1 | 6/2015 | Foo et al. |
| 2015/0180725 A1 | 6/2015 | Varney et al. |
| 2015/0180767 A1 | 6/2015 | Tam et al. |
| 2015/0181309 A1 | 6/2015 | Shepherd et al. |
| 2015/0188949 A1* | 7/2015 | Mahaffey .......... H04L 63/20 726/1 |
| 2015/0195197 A1 | 7/2015 | Yong et al. |
| 2015/0222516 A1 | 8/2015 | Deval et al. |
| 2015/0222533 A1 | 8/2015 | Birrittella et al. |
| 2015/0236948 A1 | 8/2015 | Dunbar et al. |
| 2015/0319078 A1 | 11/2015 | Lee et al. |
| 2015/0319081 A1 | 11/2015 | Kasturi et al. |
| 2015/0326473 A1 | 11/2015 | Dunbar et al. |
| 2015/0333930 A1 | 11/2015 | Aysola et al. |
| 2015/0334027 A1 | 11/2015 | Bosch et al. |
| 2015/0341285 A1 | 11/2015 | Aysola et al. |
| 2015/0365495 A1 | 12/2015 | Fan et al. |

(56) References Cited

U.S. PATENT DOCUMENTS

| | | | |
|---|---|---|---|
| 2015/0381465 | A1 | 12/2015 | Narayanan et al. |
| 2015/0381557 | A1 | 12/2015 | Fan et al. |
| 2016/0028604 | A1 | 1/2016 | Chakrabarti et al. |
| 2016/0028640 | A1 | 1/2016 | Zhang et al. |
| 2016/0043952 | A1 | 2/2016 | Zhang et al. |
| 2016/0048403 | A1* | 2/2016 | Bugenhagen ....... G06F 9/45558 718/1 |
| 2016/0050117 | A1 | 2/2016 | Voellmy et al. |
| 2016/0050132 | A1 | 2/2016 | Zhang |
| 2016/0080263 | A1 | 3/2016 | Park et al. |
| 2016/0099853 | A1 | 4/2016 | Nedeltchev et al. |
| 2016/0119159 | A1 | 4/2016 | Zhao et al. |
| 2016/0119253 | A1 | 4/2016 | Kang et al. |
| 2016/0127139 | A1 | 5/2016 | Tian et al. |
| 2016/0134518 | A1 | 5/2016 | Callon et al. |
| 2016/0134535 | A1 | 5/2016 | Callon |
| 2016/0139939 | A1 | 5/2016 | Bosch et al. |
| 2016/0164776 | A1 | 6/2016 | Biancaniello |
| 2016/0165014 | A1 | 6/2016 | Nainar et al. |
| 2016/0173373 | A1 | 6/2016 | Guichard et al. |
| 2016/0173464 | A1 | 6/2016 | Wang et al. |
| 2016/0182336 | A1 | 6/2016 | Doctor et al. |
| 2016/0182342 | A1 | 6/2016 | Singaravelu et al. |
| 2016/0182684 | A1 | 6/2016 | Connor et al. |
| 2016/0212017 | A1 | 7/2016 | Li et al. |
| 2016/0226742 | A1 | 8/2016 | Apathotharanan et al. |
| 2016/0248685 | A1 | 8/2016 | Pignataro et al. |
| 2016/0277250 | A1 | 9/2016 | Maes |
| 2016/0285720 | A1 | 9/2016 | Mäenpää et al. |
| 2016/0323165 | A1 | 11/2016 | Boucadair et al. |
| 2016/0352629 | A1 | 12/2016 | Wang et al. |
| 2016/0380966 | A1 | 12/2016 | Gunnalan et al. |
| 2017/0019303 | A1 | 1/2017 | Swamy et al. |
| 2017/0031804 | A1 | 2/2017 | Ciszewski et al. |
| 2017/0078175 | A1 | 3/2017 | Xu et al. |
| 2017/0078176 | A1* | 3/2017 | Lakshmikantha .. H04L 43/0852 |
| 2017/0187609 | A1 | 6/2017 | Lee et al. |
| 2017/0208000 | A1 | 7/2017 | Bosch et al. |
| 2017/0214627 | A1 | 7/2017 | Zhang et al. |
| 2017/0237656 | A1 | 8/2017 | Gage et al. |
| 2017/0250917 | A1 | 8/2017 | Ruckstuhl et al. |
| 2017/0272470 | A1 | 9/2017 | Gundamaraju et al. |
| 2017/0279712 | A1 | 9/2017 | Nainar et al. |
| 2017/0310611 | A1 | 10/2017 | Kumar et al. |
| 2017/0331741 | A1 | 11/2017 | Fedyk et al. |
| 2018/0013841 | A1 | 1/2018 | Nainar et al. |
| 2018/0026884 | A1 | 1/2018 | Nainar et al. |
| 2018/0026887 | A1 | 1/2018 | Nainar et al. |
| 2018/0041470 | A1 | 2/2018 | Schultz et al. |
| 2018/0062991 | A1 | 3/2018 | Nainar et al. |
| 2019/0059117 | A1* | 2/2019 | Shu ..................... H04W 76/19 |
| 2019/0068495 | A1* | 2/2019 | Jeuk .................. H04L 41/5096 |
| 2019/0205156 | A1* | 7/2019 | Huang .................... G06F 9/455 |

FOREIGN PATENT DOCUMENTS

| | | |
|---|---|---|
| EP | 3 160 073 | 10/2015 |
| JP | 2016149686 | 8/2016 |
| WO | WO-2011029321 A1 | 3/2011 |
| WO | WO 2012/056404 | 5/2012 |
| WO | WO 2015/065353 | 5/2015 |
| WO | WO 2015/180559 | 12/2015 |
| WO | WO 2015/187337 | 12/2015 |
| WO | WO-2016004556 A1 | 1/2016 |
| WO | WO 2016/058245 | 4/2016 |
| WO | WO 2017/011607 | 1/2017 |

OTHER PUBLICATIONS

3GPP TR 23.803 V7.0.0 (Sep. 2005) Technical Specification: Group Services and System Aspects; Evolution of Policy Control and Charging (Release 7), 3rd Generation Partnership Project (3GPP), 650 Route des Lucioles—Sophia Antipolis Val bonne—France, Sep. 2005; 30 pages.

3GPP TS 23.203 V8.9.0 (Mar. 2010) Technical Specification: Group Services and System Aspects; Policy and Charging Control Architecture (Release 8), 3rd Generation Partnership Project (3GPP), 650 Route des Lucioles—Sophia Antipolis Val bonne—France, Mar. 2010; 116 pages.

3GPP TS 23.401 V13.5.0 (Dec. 2015) Technical Specification: 3rd Generation Partnership Project; Technical Specification Group Services and System Aspects; General Packet Radio Service (GPRS) enhancements for Evolved Universal Terrestrial Radio Access Network (E-UTRAN) access (Release 13), 3GPP, 650 Route des Lucioles—Sophia Antipolis Valbonne—France, Dec. 2015.

3GPP TS 29.212 V13.1.0 (Mar. 2015) Technical Specification: 3rd Generation Partnership Project; Technical Specification Group Core Network and Terminals; Policy and Chargig Control (PCC); Reference points (Release 13), 3rd Generation Partnership Project (3GPP), 650 Route des Lucioles—Sophia Antipolis Valbonne—France, Mar. 2015; 230 pages.

U.S. Appl. No. 15/252,028, filed Aug. 30, 2016, entitled "System and Method for Managing Chained Services in a Network Environment," Inventor(s): Hendrikus G.P. Bosch, et al.

P. Quinn, et al., "Network Service Header," Network Working Group, Feb. 14, 2014, 21 pages; https://svn.tools.ietf.org/html/draft-quinn-sfc-nsh-02.

P. Quinn, et al., "Service Function Chaining (SFC) Architecture," Network Working Group, May 5, 2014, 31 pages; https://svn.tools.ietf.org/html/draft-quinn-sfc-arch-05.

International Search Report and Written Opinion from the International Searching Authority, dated Aug. 30, 2017, for the corresponding International Application No. PCT/US2017/040575, 13 pages.

Alizadeh, Mohammad, et al., "CONGA: Distributed Congestion-Aware Load Balancing for Datacenters," SIGCOMM '14, Aug. 17-22, 2014, 12 pages.

Author Unknown, "IEEE Standard for the Functional Architecture of Next Generation Service Overlay Networks, IEEE Std. 1903-2011," IEEE, Piscataway, NJ, Oct. 7, 2011; 147 pages.

Author Unknown, "OpenNebula 4.6 User Guide," Jun. 12, 2014, opennebula.org, 87 pages.

Author Unknown, "Service-Aware Network Architecture Based on SDN, NFV, and Network Intelligence," 2014, 8 pages.

Bi, Jing, et al., "Dynamic Provisioning Modeling for Virtualized Multi-tier Applications in Cloud Data Center," 2010 IEEE 3rd International Conference on Cloud Computing, Jul. 5, 2010, pp. 370-377, IEEE Computer Society.

Bitar, N., et al., "Interface to the Routing System (I2RS) for the Service Chaining: Use Cases and Requirements," draft-bitar-i2rs-service-chaining-01, Feb. 14, 2014, pp. 1-15.

Bremler-Barr, Anat, et al., "Deep Packet Inspection as a Service," CoNEXT '14, Dec. 2-5, 2014, pp. 271-282.

Cisco Systems, Inc. "Cisco VN-LINK: Virtualization-Aware Networking," 2009, 9 pages.

Dunbar, et al., "Architecture for Chaining Legacy Layer 4-7 Service Functions," IETF Network Working Group Internet Draft, draft-dunbar-sfc-legacy-14-17-chain-architecture-03.txt, Feb. 10, 2014; 17 pages.

Farrel, A., et al., "A Path Computation Element (PCE)—Based Architecture," RFC 4655, Network Working Group, Aug. 2006, 40 pages.

Jiang, Y., et al., "An Architecture of Service Function Chaining," IETF Network Working Group Internet Draft, draft-jiang-sfc-arch-01.txt, Feb. 14, 2014; 12 pages.

Katsikas, Goergios P., et al., "Profiling and accelerating commodity NFV service chains with SCC," The Journal of Systems and Software, vol. 127, Jan. 2017, pp. 12-27.

Kumbhare, Abhijit, et al., "Opendaylight Service Function Chaining Use-Cases," Oct. 14, 2014, 25 pages.

Li, Hongyu, "Service Function Chaining Use Cases", IETF 88 Vancouver, Nov. 7, 2013, 7 pages.

Mortensen, A., et al., "Distributed Denial of Service (DDoS) Open Threat Signaling Requirements," DOTS, Mar. 18, 2016, 16 pages; https://tools.ietf.org/pdf/draft-ietf-dots-requirements-01.pdf.

(56) References Cited

OTHER PUBLICATIONS

Newman, David, "Review: FireEye fights off multi-stage malware," Network World, May 5, 2014, 7 pages.
Nguyen, Kim-Khoa, et al. "Distributed Control Plane Architecture of Next Generation IP Routers," IEEE, 2009, 8 pages.
Quinn, P., et al., "Network Service Header," Network Working Group, Mar. 24, 2015, 42 pages; https://tools.ietf.org/pdf/daft-ietf-sfo-nsh-00.pdf.
Quinn, P., et al., "Network Service Chaining Problem Statement," draft-quinn-nsc-problem-statement-03.txt, Aug. 26, 2013, 18 pages.
Quinn, Paul, et al., "Service Function Chaining: Creating a Service Plane via Network Service Headers," IEEE Computer Society, 2014, pp. 38-44.
Zhang, Ying, et al. "StEERING: A Software-Defined Networking for Inline Service Chaining," IEEE, 2013, IEEE, p. 10 pages.
Aldrin, S., et al. "Service Function Chaining Operation, Administration and Maintenance Framework," Internet Engineering Task Force, Oct. 26, 2014, 13 pages.
Author Unknown, "ANSI/SCTE 35 2007 Digital Program Insertion Cueing Message for Cable," Engineering Committee, Digital Video Subcommittee, American National Standard, Society of Cable Telecommunications Engineers, © Society of Cable Telecommunications Engineers, Inc. 2007 All Rights Reserved, 140 Philips Road, Exton, PA 19341; 42 pages.
Author Unknown, "AWS Lambda Developer Guide," Amazon Web Services Inc., May 2017, 416 pages.
Author Unknown, "CEA-708," from Wikipedia, the free encyclopedia, Nov. 15, 2012; 16 pages http://en.wikipedia.org/w/index.php?title=CEA-408&oldid=523143431.
Author Unknown, "Cisco and Intel High-Performance VNFs on Cisco NFV Infrastructure," White Paper, Cisco and Intel, Oct. 2016, 7 pages.
Author Unknown, "Cloud Functions Overview," Cloud Functions Documentation, Mar. 21, 2017, 3 pages; https://cloud.google.com/functionsn/doc/concepts/overview.
Author Unknown, "Cloud-Native VNF Modelling," Open Source Mano, © ETSI 2016, 18 pages.
Author Unknown, "Digital Program Insertion," from Wikipedia, the free encyclopedia, Jan. 2, 2012; 1 page http://en.wikipedia.org/w/index.php?title=Digital_Program_Insertion&oldid=469076482.
Author Unknown, "Dynamic Adaptive Streaming over HTTP," from Wikipedia, the free encyclopedia, Oct. 25, 2012; 3 pages, http://en.wikpedia.org/w/index.php?title=Dynannic_Adaptive_Streanning_over_HTTP&oldid=519749189.
Author Unknown, "GStreamer and in-band metadata," from RidgeRun Developer Connection, Jun. 19, 2012, 5 pages https://developersidgerun.conn/wiki/index.php/GStreanner_and_in-band_nnetadata.
Author Unknown, "ISO/IEC JTC 1/SC 29, Information Technology—Dynamic Adaptive Streaming over HTTP (DASH)—Part 1: Media Presentation Description and Segment Formats," International Standard © ISO/IEC 2012—All Rights Reserved; Jan. 5, 2012; 131 pages.
Author Unknown, "M-PEG 2 Transmission," © Dr. Gorry Fairhurst, 9 pages [Published on or about Jan. 12, 2012] http://www.erg.abdn.ac.uk/future-net/digital-video/mpeg2-trans.html.
Author Unknown, "MPEG Transport Stream," from Wikipedia, the free encyclopedia, Nov. 11, 2012; 7 pages, http://en.wikipedia.org/w/index.php?title=MPEG_transport_streann&oldid=522468296.
Author Unknown, "Network Functions Virtualisation (NFV); Use Cases," ETSI, GS NFV 001 v1.1.1, Architectural Framework, © European Telecommunications Standards Institute, Oct. 2013, 50 pages.
Author Unknown, "Understanding Azure, A Guide for Developers," Microsoft Corporation, Copyright © 2016 Microsoft Corporation, 39 pages.
Baird, Andrew, et al. "AWS Serverless Multi-Tier Architectures; Using Amazon API Gateway and AWS Lambda," Amazon Web Services Inc., Nov. 2015, 20 pages.
Boucadair, Mohamed, et al., "Differentiated Service Function Chaining Framework," Network Working Group Internet Draft draft-boucadair-network-function-chaining-03, Aug. 21, 2013, 21 pages.
Cisco Systems, Inc. "Cisco NSH Service Chaining Configuration Guide," Jul. 28, 2017, 11 pages.
Ersue, Mehmet, "ETSI NFV Management and Orchestration—An Overview," Presentation at the IETF# 88 Meeting, Nov. 3, 2013, 14 pages.
Fayaz, Seyed K., et al., "Efficient Network Reachability Analysis using a Succinct Control Plane Representation," 2016, ratul.org, pp. 1-16.
Halpern, Joel, et al., "Service Function Chaining (SFC) Architecture," Internet Engineering Task Force (IETF), Cisco, Oct. 2015, 32 pages.
Hendrickson, Scott, et al. "Serverless Computation with OpenLambda," Elastic 60, University of Wisconson, Madison, Jun. 20, 2016, 7 pages, http://www.usenix.org/system/files/conference/hotcloud16/hotcloud16_hendrickson.pdf.
Jiang, Yuanlong, et al., "Fault Management in Service Function Chaining," Network Working Group, China Telecom, Oct. 16, 2015, 13 pages.
Kumar, Surendra, et al., "Service Function Path Optimization: draft-kumar-sfc-sfp-optimization-00.txt," Internet Engineering Task Force, IETF; Standard Working Draft, May 10, 2014, 14 pages.
Penno, Reinaldo, et al. "Packet Generation in Service Function Chains," draft-penno-sfc-packet-03, Apr. 29, 2016, 25 pages.
Penno, Reinaldo, et al. "Services Function Chaining Traceroute," draft-penno-sfc-trace-03, Sep. 30, 2015, 9 pages.
Pierre-Louis, Marc-Arhtur, "OpenWhisk: A quick tech preview," DeveloperWorks Open, IBM, Feb. 22, 2016, modified Mar. 3, 2016, 7 pages; https://developer.ibm.com/open/2016/02/22/openwhisk-a-quick-tech-preview/.
Pujol, Pua Capdevila, "Deployment of NFV and SFC scenarios," EETAC, Master Thesis, Advisor: David Rincon Rivera, Universitat Politecnica De Catalunya, Feb. 17, 2017, 115 pages.
Quinn, Paul, et al., "Network Service Header," Network Working Group, draft-quinn-nsh-00.txt, Jun. 13, 2013, 20 pages.
Quinn, Paul, et al., "Network Service Header," Network Working Group Internet Draft draft-quinn-nsh-01, Jul. 12, 2013, 20 pages.
Wong, Fei, et al., "SMPTE-TT Embedded in ID3 for HTTP Live Streaming, draft-smpte-id3-http-live-streaming-00," Informational Internet Draft, Jun. 2012, 7 pages http://tools.ietf.org/htnnl/draft-snnpte-id3-http-live-streaming-00.
Yadav, Rishi, "What Real Cloud-Native Apps Will Look Like," Crunch Network, posted Aug. 3, 2016, 8 pages; https://techcrunch.com/2016/08/03/what-real-cloud-native-apps-will-look-like/.

* cited by examiner

SYSTEMS AND METHODS FOR PROVIDING CONTAINER ATTRIBUTES AS PART OF OAM TECHNIQUES

TECHNICAL FIELD

The present technology pertains in general to providing container specific attributes for packets serviced by or traversing one or more containers such that a holistic overview of an entirety of a path through which data packets travel in a cloud-based network can be obtained.

BACKGROUND

With the introduction of microservices architecture into cloud computing, it is now common to see different services of an application distributed into different containers. For example, in service chaining environment, it is common to see different service functions instantiated as different containers over one or more physical hosts.

Currently, network operators using existing In-Situ Operation, Administration and Management (OAM), Segment Routing Header (SRH) and/or Network Service Header (NSH) tools are capable of collecting link level information (e.g., IP address, timestamps, etc.) regarding a path through which a data packet travels in a network. However, these OAM tools cannot collect virtual level information regarding such path. In other words, currently utilized OAM tools cannot collect container specific information, with each container instantiating one or more services of a service function (e.g., an application). This lack of ability to collect container specific information provides an incomplete view of the traffic path between various containers and/or end destinations of data, because when a physical server hosts multiple containers, these containers share the same IP address as the physical host and thus in the view of the OAM tool, they are all the same. Similarly in an environment where containers are spanning different physical host, service function forwarder (SFF) may be instantiated in one physical host while the service functions (SFs) within the cluster might be spanning over different physical hosts. In such environments, just including the physical/SFF details as part of In-Situ OAM will not be sufficient.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
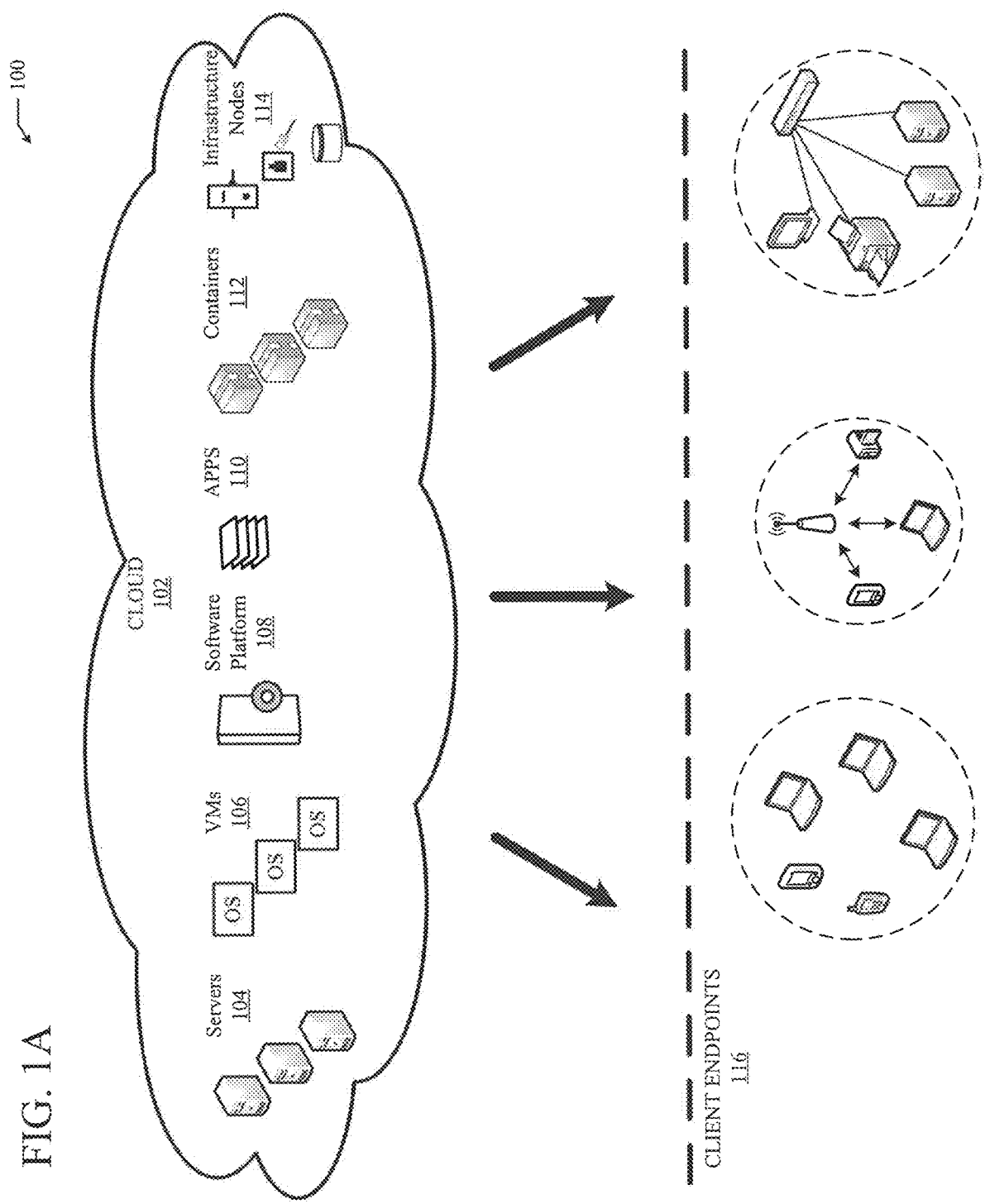
FIG. 1A illustrates an example cloud computing architecture, according to one aspect of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As referenced herein, a Function Router can include a service that provides for registration and management of execution endpoints, FaaS services, functions, clients, locations, and routing rules on an account. The Function Router can receive requests for function execution from clients and dynamically route them to the 'best' endpoint to execute that function based on defined rules.

An Execution Endpoint (EE) can include a compute-capable system that can run functions. Non-limiting examples can include computers, laptops, IoT devices, servers, switches, mobile phones, kiosks, workstations, etc. EEs can be registered in the Function Router for use in executing functions. Execution endpoints can run various FaaS run-time environments and services.

A client can include a device and/or application seeking to execute a function on an Execution Endpoint. Non-limiting examples of a client can include a robot arm, mobile phone, hand scanner, application, printer, kiosk, etc.

A function can include a piece of code. The piece of code can represent, for example, an ephemeral, self-contained set of business logic. Serverless functions can be compared to stored procedures in that they do a specific thing, and are called and executed when needed, only to go back to being dormant (but ready) when execution completes.

A location can include a physical location (e.g., a building, a floor, etc.) and/or a logical location. A location can be associated with specific latitude and longitude coordinates. For example, a location can refer to specific latitude and longitude coordinates corresponding to the manufacturing floor where a robot resides or a conference room where an FaaS device is plugged in, or a region associated with an environment.

Function routing rules can include policies and controls around who, what, when, where, why, and/or how for function execution. The rules can include IT-defined guardrails that affect the entire system, and other rules specified by IT or a development team for a specific function. Example rules can include: Function A can run on any endpoint but Function B must only run on a private endpoint; or Function A can be called by any client in a specific location, but function B can only be called by specific clients in any location.

Overview

Disclosed are systems, methods, and computer-readable media providing container attributes for packets services by or traveling through one or more containers in order to provide a more complete picture of an entirety of a path through which data packets travels in a cloud-based network.

In one aspect of the present disclosure, a method includes receiving a data packet at a corresponding container; determining identification information of the corresponding container; modifying the data packet to include the container specific information to yield a modified data packet; and forwarding the modified data packet to a next destination based on destination information included in the data packet.

In one aspect of the present disclosure, a system includes one or more processors and at least one memory configured to store computer-readable instructions, which when executed by the one or more processors, configure the one or more processors to receive a data packet at a corresponding container; determine identification information of the corresponding container; modify the data packet to include the container specific information to yield a modified data packet; and forward the modified data packet to a next destination based on destination information included in the data packet.

In one aspect of the present disclosure, a non-transitory computer-readable medium has computer-readable instructions, which when executed by one or more processors, cause the one or more processors to receive a data packet at a corresponding container; determine identification information of the corresponding container; modify the data packet to include the container specific information to yield a modified data packet; and forward the modified data packet to a next destination based on destination information included in the data packet.

DESCRIPTION OF EXAMPLE EMBODIMENTS The disclosed technology addresses the need in the art for providing a more granular view of a path through which a data packet travels in a network that includes container specific attributes of containers that service the data packet. The present technology involves systems, methods, and computer-readable media for determining and including container specific attributes as part of information identifying containers that a data packet traverses in a network.

Figure 1B:
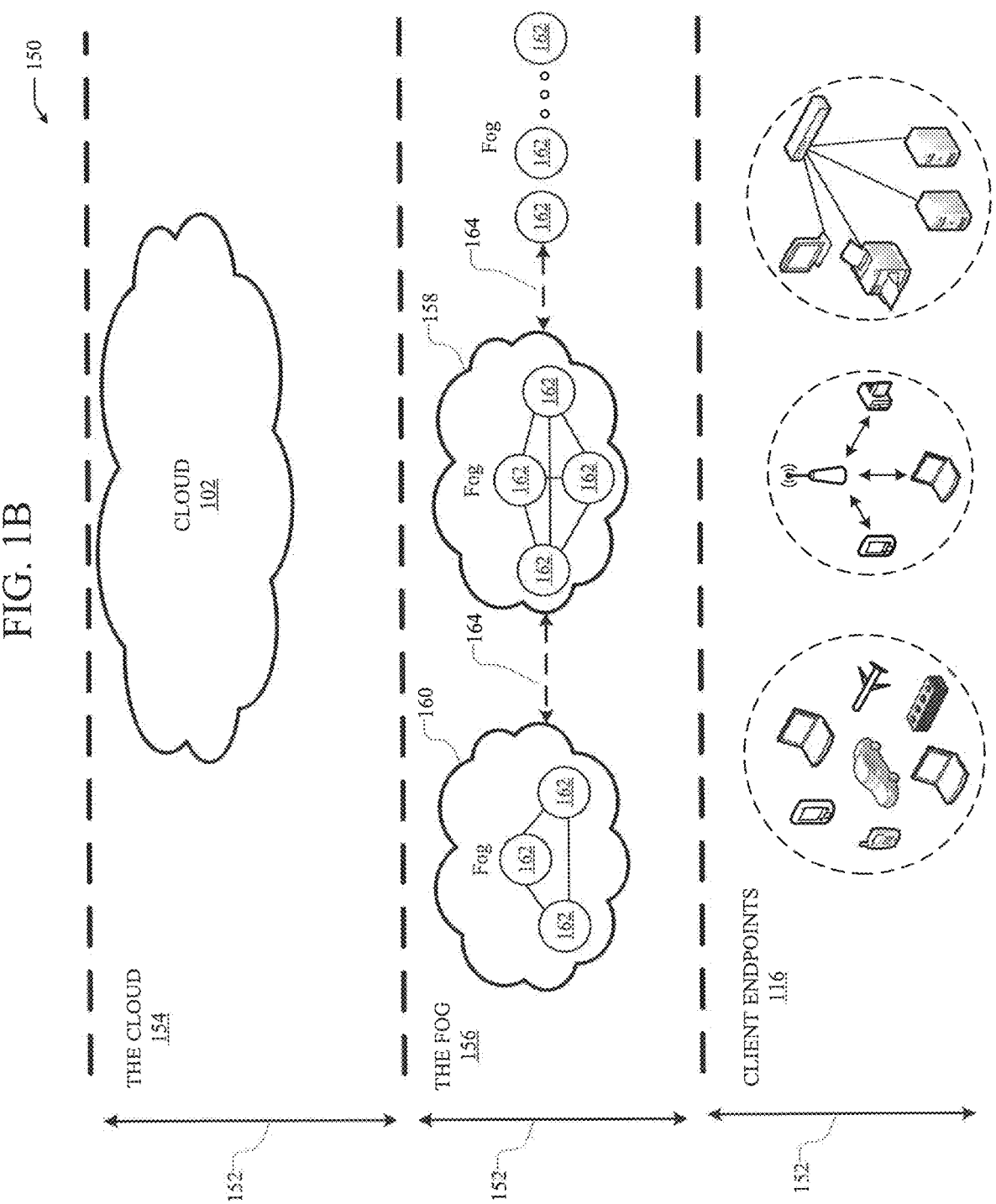
FIG. 1B illustrates an example fog computing architecture, according to one aspect of the present disclosure.
Figure 2:
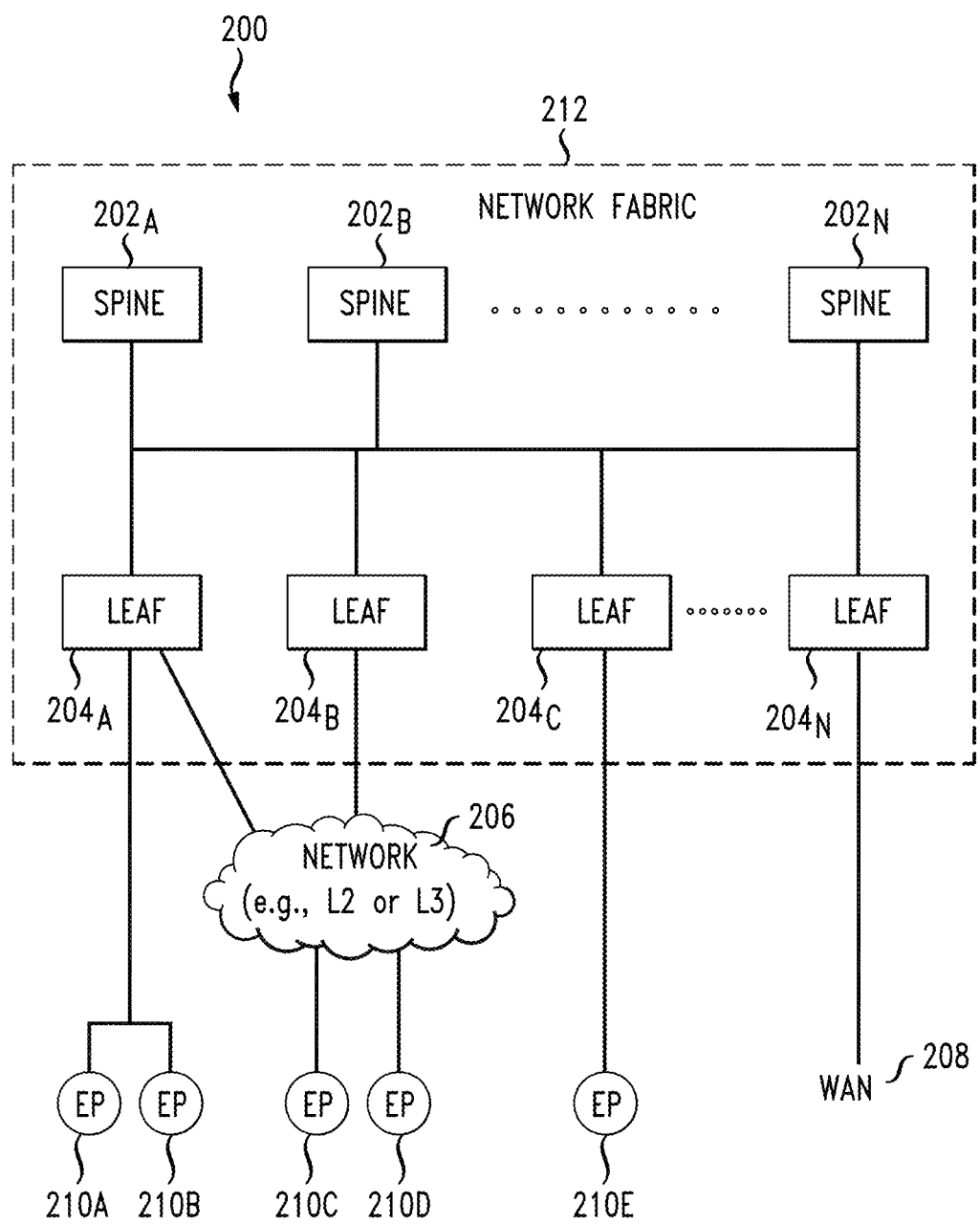
FIG. 2 illustrates a schematic diagram of an example network architecture, according to one aspect of the present disclosure.

The disclosure begins with a description of example network environments and architectures which can be implemented for serverless computing and service function chaining, as illustrated in FIGS. 1A, 1B, and 2, is first disclosed herein.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), function as a service (FaaS), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

FIG. 1B illustrates a diagram of an example fog computing architecture 150. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, kiosks, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 158 can be local or regional clouds or networks. For example, the fog instances 156, 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

FIG. 2 illustrates a schematic block diagram of an example network architecture 200. In some cases, the architecture 200 can include a data center, which can support and/or host the cloud 102. Moreover, the architecture 200 includes a network fabric 212 with spines 202A, 202B, . . . , 202N (collectively "202") connected to leafs 204A, 204B, 204C, . . . , 204N (collectively "204") in the network fabric 212. Spines 202 and leafs 204 can be Layer 2 and/or Layer 3 devices, such as switches or routers. For the sake of clarity, they will be referenced herein as spine switches 202 and leaf switches 204.

Spine switches 202 connect to leaf switches 204 in the fabric 212. Leaf switches 204 can include access ports (or non-fabric ports) and fabric ports. Fabric ports can provide uplinks to the spine switches 202, while access ports can provide connectivity for devices, hosts, endpoints, VMs, or external networks to the fabric 212.

Leaf switches 204 can reside at the boundary between the fabric 212 and the tenant or customer space. The leaf switches 204 can route and/or bridge the tenant packets and apply network policies. In some cases, a leaf switch can perform one or more additional functions, such as implementing a mapping cache, sending packets to the proxy function when there is a miss in the cache, encapsulate packets, enforce ingress or egress policies, etc.

Moreover, the leaf switches 204 can contain virtual switching and/or tunneling functionalities, such as a virtual tunnel endpoint (VTEP) function. Thus, leaf switches 204 can connect the fabric 212 to an overlay (e.g., VXLAN network).

Network connectivity in the fabric 212 can flow through the leaf switches 204. The leaf switches 204 can provide servers, resources, endpoints, external networks, containers, or VMs access to the fabric 212, and can connect the leaf switches 204 to each other. The leaf switches 204 can connect applications and/or endpoint groups ("EPGs") to other resources inside or outside of the fabric 212 as well as any external networks.

Endpoints 210A-E (collectively "210") can connect to the fabric 212 via leaf switches 204. For example, endpoints 210A and 210B can connect directly to leaf switch 204A, which can connect endpoints 210A and 210B to the fabric 212 and/or any other of the leaf switches 204. Similarly, endpoint 210E can connect directly to leaf switch 204C, which can connect endpoint 210E to the fabric 212 and/or any other of the leaf switches 204. On the other hand, endpoints 210C and 210D can connect to leaf switch 204A and 204B via network 206. Moreover, the wide area network (WAN) 208 can connect to the leaf switches 204N.

Endpoints 210 can include any communication device or resource, such as a computer, a server, a cluster, a switch, a container, a VM, a virtual application, etc. In some cases, the endpoints 210 can include a server or switch configured with a virtual tunnel endpoint functionality which connects an overlay network with the fabric 212. For example, in some cases, the endpoints 210 can represent hosts (e.g., servers) with virtual tunnel endpoint capabilities, and running virtual environments (e.g., hypervisor, virtual machine(s), containers, etc.). An overlay network associated with the endpoints 210 can host physical devices, such as servers; applications; EPGs; virtual segments; virtual workloads; etc. Likewise, endpoints 210 can also host virtual workloads and applications, which can connect with the fabric 212 or any other device or network, including an external network.

Figure 3:
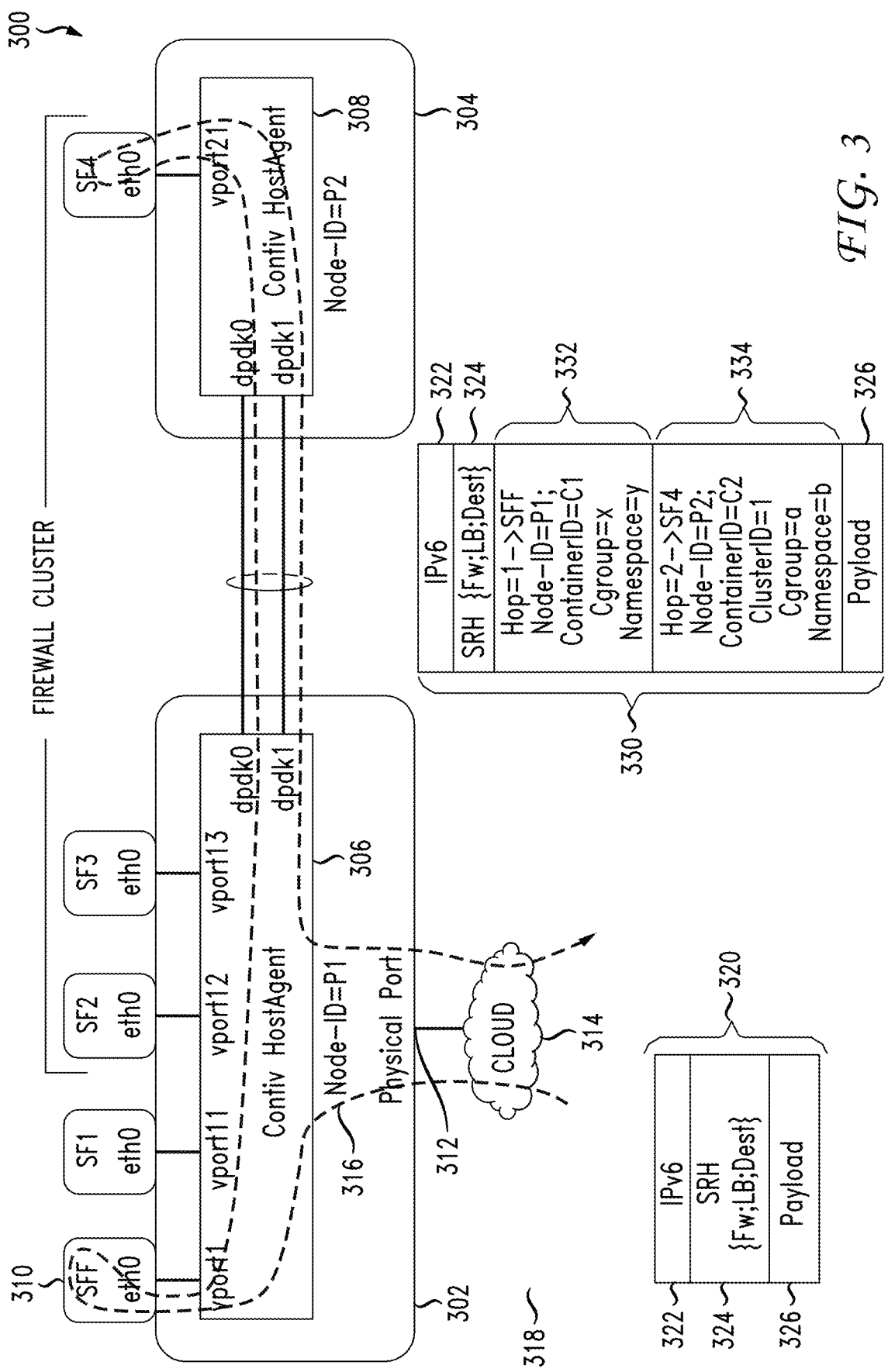
FIG. 3 illustrates an example structure of containers instantiated over two physical hosts, according to one aspect of the present disclosure.

FIG. 3 illustrates an example structure of containers instantiated over two physical hosts, according to one aspect of the present disclosure.

Environment 300 includes two physical hosts 302 and 304 (which can be the same as two of servers 104 show in and described with reference to FIG. 1A). Each one of physical hosts 302 and 304 can have a Contiv HostAgent operating thereon such as Contiv HostAgents 306 and 308. Contiv HostAgents 306 and 308 can deliver policy-based management of various service functions deployed/instantiated as containers on a corresponding physical host.

Physical host 302 can have one or more containers instantiated thereon. For example, each container can provide one service function (SF) such as one of SF1, SF2 or SF3 on physical host 302, while another container can provide another one of SF1, SF2 or SF3 and another container can provide the remaining one of SF1, SF2 and SF3. Furthermore, physical host 302 can have a service function forwarder (SFF) 310, provided by a separate container running on physical host 302 or alternatively provided by one of the container(s) providing SF1, SF2 and/or SF3, that can direct data traffic and tasks to different containers depending on the specific function to be performed. Similarly, physical host 304 can have a SF4 running thereon. In one example, SF1-SF4 provide a firewall service to one or more customers such as client endpoints 116 of FIG. 1A. Accordingly, in the example of FIG. 3, different service functions are instantiated as different containers on two different physical hosts, namely physical hosts 302 and 304. This distribution of service functions over different physical hosts can be due to, for example, high demand for particular service function being provided by a container on a given physical host and can be done for purposes of load balancing. Hereinafter, reference may be made to a SF or a SFF performing a function. It is understood that such statement is to be interpreted to also mean that a container providing the SF or the SFF is performing the function. Therefore, a function performed by a SF or a SFF is the same as the function being performed by the container that provides the SF or the SFF.

Accordingly, in the example of FIG. 3, SFF 310 and SF1, SF2 and SF3 of the firewall service are instantiated as different containers on physical host 302 while SF4 of the firewall service is instantiated as another container on physical host 304.

Physical host 302 can have one or more physical ports 312 that can be the ingress and egress point of data packets coming into and leaving example environment 300 via cloud 314 (cloud 314 can be the same as cloud 102 of FIGS. 1A-B). Through Contiv HostAgent 306, the incoming data packet is sent to SFF 310. In one example, Contiv HostAgent has several ports (e.g., virtual ports (vport)) through which it communicates with SFF 310 and each one of SF1, SF2 and SF3. For example, Contiv HostAgent 306 sends the incoming data packet to SFF 310 via vport1. SFF 310 then receives the incoming packet at its corresponding vport (e.g., eth0 of SFF 310). As shown in FIG. 3, Contiv HostAgent 306 can have various vports for interfacing with each instance of SF of a container instantiated thereon, such as vport11, vport12 and vport13 for interfacing with SF1, SF2 and SF3 respectively, with each one of SF1, SF2 and SF3 having its own vport eth( ).

SFF 310 can then determine which one of SF1, SF2, SF3 or SF4 to forward the received data packet to. SFF 310 can make such determination based on factors including, but not limited to, the particular function being request for/applicable to the incoming data packet, load balancing criteria for optimal utilization of SFs in servicing data packets, etc.

In example of FIG. 3, SFF 310 is assumed to determine that a received data packet is to be forwarded to SF4 for servicing, which resides in and is instantiated as a container on physical host 304. Accordingly, SFF 310 forwards the received data packet to SF4 residing on physical host 304 via port dpdk0 of Contiv HostAgent 306, which is then received at port dpdk0 of Contiv HostAgent 308 of physical host 304. The received data packet after being serviced/processed by SF4, is sent back to the requesting end user via cloud 314. For example, the serviced data packet is sent to port dpdk1 of Contiv HostAgent 308, which is then sent to and received at port dpdk1 of Contiv HostAgent 306 followed by transmission of the same over cloud 314, via physical port 314, to the requesting/intended end user such as one or more of client endpoints 116 described with reference to FIG. 1A (and/or any other destination depending on information included in the SRH or a network service header (NSH) of the data packet).

In the example of FIG. 3, from the point in time at which an incoming data packet is received at physical port 312 of physical host 302 to the point in time at which a corresponding processed data packet is sent back to the intended end user, the data packet traverses SFF 310 and SF4 instantiated on physical host 304, as shown by dashed line 316. It should be noted that FIG. 3, the components thereof and the travel path 316 of a data packet described in relation thereto, are just examples and are in no way intended to limit the scope of the present disclosure. Any type of service through any number of combination of SFs instantiated as one or more containers over one or more physical hosts, are envisioned and fall within the scope of the present disclosure.

As described in the Background section above, currently, network operators using existing In-Situ OAM, SRH or NSH tools are capable of collecting link level information (e.g., IP address, timestamps, etc.) regarding a path through which a data packet travels. However, these tools cannot collect virtual level information regarding such path. This lack of ability to collect container specific information provides an incomplete view of the traffic path between various containers and/or end destinations of data packets, because, for example, when a physical server hosts multiple containers, these containers share the same IP address as the physical host and thus in the view of the OAM, SRH or NSH tools, they are all the same.

In relation to example of FIG. 3, currently utilized in-Situ OAM, SRH or NSH tools do not provide container specific attributes and information on each one of SFF 310 and SF4 of FIG. 3, that an example data packet traverses. Hereinafter, a method is described according to which, container specific information and attributes are added to each data packet by each container/SFF/SF through which a data packet travels.

FIG. 3 illustrates an example data packet and changes made thereto to include container specific attributes and information, as the data packet traverses environment 300. As shown in FIG. 3, when a data packet is first received physical port 312, the data packet can have format 320 that has, for example, IPv6 header 322, SRH 324 and payload 326. IPv6 header 322 can include information such as a source address of the data packet, a destination address of the data packet, payload length of the data packet, etc. SRH 324 can include information that identify, for example, the service function provided (e.g., FW for Firewall), indicate the function to be performed (e.g., LB for load balancing to be performed by SFF 310) and identify the destination of the data packet (e.g., DEST for destination). While SRH 324 is provided as one example, in another example, in-situ OAM (iOAM) header or a network service header (NSH) can be included as part of format 320 instead of and/or in combination with SRH 324.

Once the data packet has traversed the network and is serviced by SFF 310/SF4, the processed data packet is received at physical port 312 and is ready to be sent back via cloud 314 to the intended destination/node, as indicated in the SRH or NSH of the data packet. The processed data packet, as shown in FIG. 3, has a modified format 330 that includes container specific attributes/information (added to the data packet by SFF 310 and SF4 that the data packet traversed as shown by dashed-line 316).

According to format 330 and in comparison with format 320, SRH 324 can include additional information by including metadata 332 and metadata 334 while IPv6 header 322 and payload 326 can be the same as that of format 320.

In one example, metadata 332 is added by SFF 310 upon receiving the data packet. As shown in FIG. 3, metadata 332 can include container specific attributes (e.g., attributes specific to a container providing SFF 310), including, but not limited to, SFF 310 (Hop=1→SFF), container ID of SFF 310 (ContainerID=C1), container group (cgroup=x) and namespace (namespace=y). Metadata 332 can also include physical host information including, but not limited to, node ID of physical host 302 (node-ID=P1) as well as information corresponding to CPU, memory and volume identification and usage information of physical host 302.

The attributes/information provided as part of metadata 332 are examples only and non-limiting. Any other type of container specific information as well as physical host specific information can be included as part of metadata 332.

Similarly, metadata 334 is added by SF4 upon receiving the data packet. As shown in FIG. 3, metadata 334 include identification of attributes specific to the container providing SF4 310 (Hop=2→SF4), container ID of SF4 (ContainerID=C2), type of function provided SF4 (e.g., in this example the service is firewall and hence type=Fw), identification of the firewall cluster (ClusterID=1), container group (cgroup=a) and namespace (namespace=b). Metadata 334 can also include physical host information including, but not limited to, node ID of physical host 304 (node-ID=P2) as well as information corresponding to CPU, memory and volume identification and usage information of physical host 304. The attributes/information provided as part of metadata 334 are examples only and non-limiting. Any other type of container specific information as well as physical host specific can be included as part of metadata 334.

In one example, container specific information/attributes provided as part of metadata 332 and 334 can include information indicating a geo-location of the corresponding container, a cost of the container and a state of the corresponding container. The state of the container can indicate whether the corresponding container is passive (in testing mode) or active. This information can be used by any subsequent container that receives the processed packet to determine which type of policy (e.g., strict in case of passive and loose in case of active) to apply.

In one example and unlike shown in FIG. 3, the entirety of the Firewall service can be provided by SFs 1-3 instantiated as different containers on physical host 302 without having to instantiate SF4 as another container on physical host 304. In such case, the Node-ID of the physical host in each one of metadata 332 and 332 will be the same while ContainerID, Cgroup and Namespace attributes included in metadata 332 and 334, would correspond to a different one of the containers.

In examples of FIG. 3, SRH 324 is used an example header of a data packet that is modified to include container and physical host specific information. However, the present disclosure is not limited thereto. For example, instead of SRH 324, a data packet can have an In-situ OAM portion (iOAM header) or NSH as part of format 320 and 330, which is modified to include the same metadata 332 and 334 described above with reference to FIG. 3.

Figure 4:
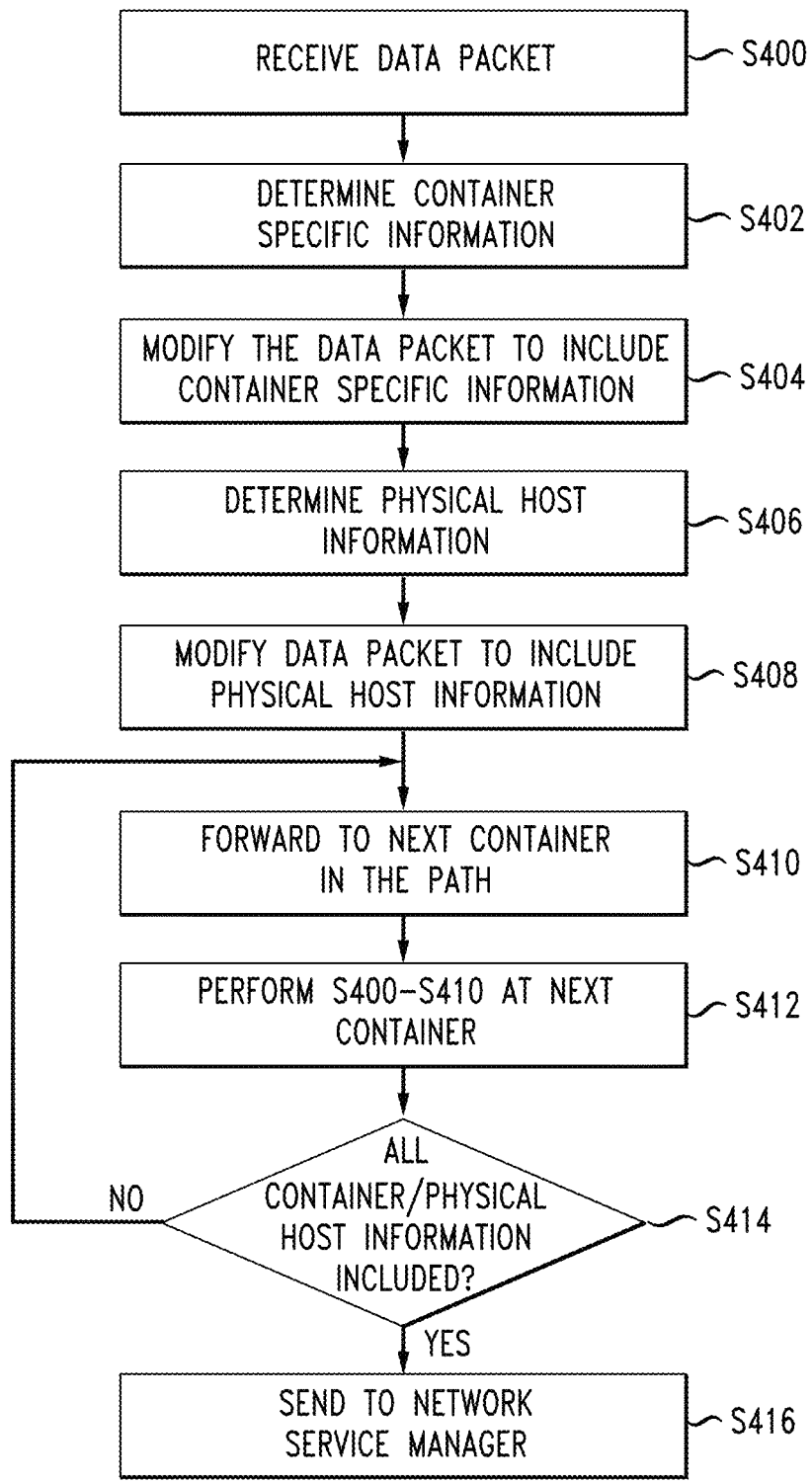
FIG. 4 illustrates a method of providing container specific attributes as part of each data packet traveling through a container, according to one aspect of the present disclosure.

FIG. 4 illustrates a method of providing container specific attributes as part of each data packet traveling through a container, according to one aspect of the present disclosure. FIG. 4 is described from the perspective of each container at which a data packet is received (each container instantiated as SFF 310 or SF4 in FIG. 3).

At S400, a container receives a data packet. For example, a data packet is received at SFF 310 or SF4, each of which is instantiated as a container.

At S402, the container determines the container's specific attributes (container specific information). For example, when a data packet is received at SFF 310 or SF4, each of which is instantiated as a different container, the container providing SFF 310 or the container providing SF4 modifies the data packet to include corresponding container specific information. As described above, the container specific information can include container ID, cgroup and namespace of the container, as described above with reference to example packet formats 320 and 330.

At S404, the container modifies the format of the data packet to include the container specific information determined at S402. In one example, the container modifies the format 320 of data packet to include the container specific information as part of SRH 324 or iOAM or NSH (if iOAM or NSH is used as header instead of SRH).

At S406, the container determines the physical host information of the physical host on which the container is instantiated. For example, when a data packet is received at SFF 310 or SF 4, which are instantiated on physical host 302 and 304, respectively, the container determines the physical host information of the corresponding one of the physical hosts 302 and 304.

Physical host information can include information such as the physical host ID, CPU identification and usage information, memory identification and usage information, physical host volume, etc.

In the same way as in S404, at S408, the container modifies the format of the data packet to include the physical host information determined at S406. In one example, the container modifies the format 320 of the data packet to include the physical host information as part of SRH 324 or iOAM or NSH (if iOAM or NSH is used as header instead of SRH).

At S410 and upon including the container specific and physical host information in the received packet, the container, forwards the data packet, as modified to include such information, to the next container (based on the information provided as part of the SRH 324, for example).

Thereafter, at S412, the next container performs S400 to S410 to include its corresponding container specific/physical host information in the received data packet.

At S414, it is determined whether the current container that performs the process at S412 is the last container in a data packet's path. If it is determined that the current container is the last container in the data packet's path, then it is determined that all relevant container/physical host specific information are included in the data packet. In one example, the determination at S414 is based on SRH 324 information indicating the next destination of a data packet. If the next destination is not another container but rather a client device destination, then it is determined that the current container is the last container in the data packet's path. However, if the next destination is another container, then the process reverts back to S410 and S410 to S414 is repeated.

Once it is determined that the current container is the last container on the data packet's path, then at S416, the current container transmits metadata of the data packet that includes all relevant container specific and physical host information (e.g., metadata 332 and 334 in the example of FIG. 3) to a network management server (e.g., one of servers 104 of FIG. 1A) followed by transmission of the data packet to the intended end destination (such as one of client devices 116 of FIG. 1A).

In another example, after each SFF or SF modifies the received data packet to include container specific and physical host information, such information are transmitted to the network management server prior to passing the data packet to its next destination (e.g., next SF in the service function chain). In other words, S416 is performed after each instance of performing S408 by the corresponding container.

The network management server can use the received container specific information and/or the physical host information to generate a complete map of the path of the data packet through the network.

Figure 5:
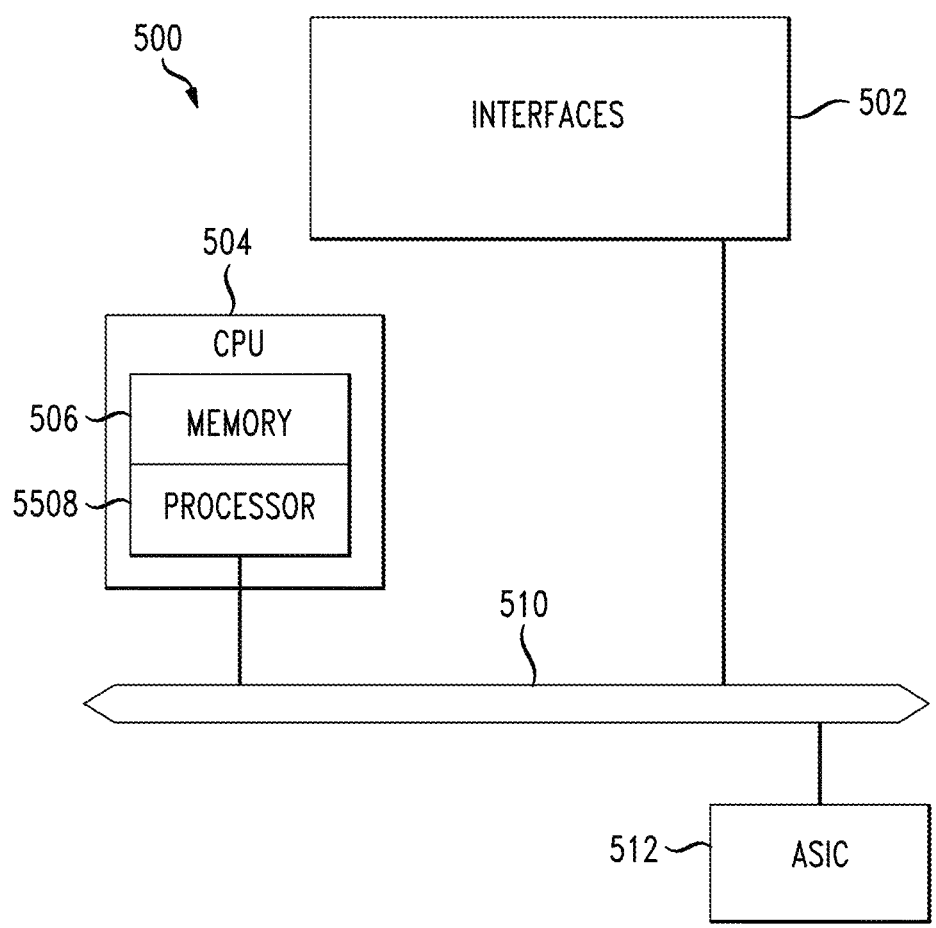
FIG. 5 illustrates an example network device 1100 suitable for performing function routing operations, according to an aspect of the present disclosure.
Figure 6:
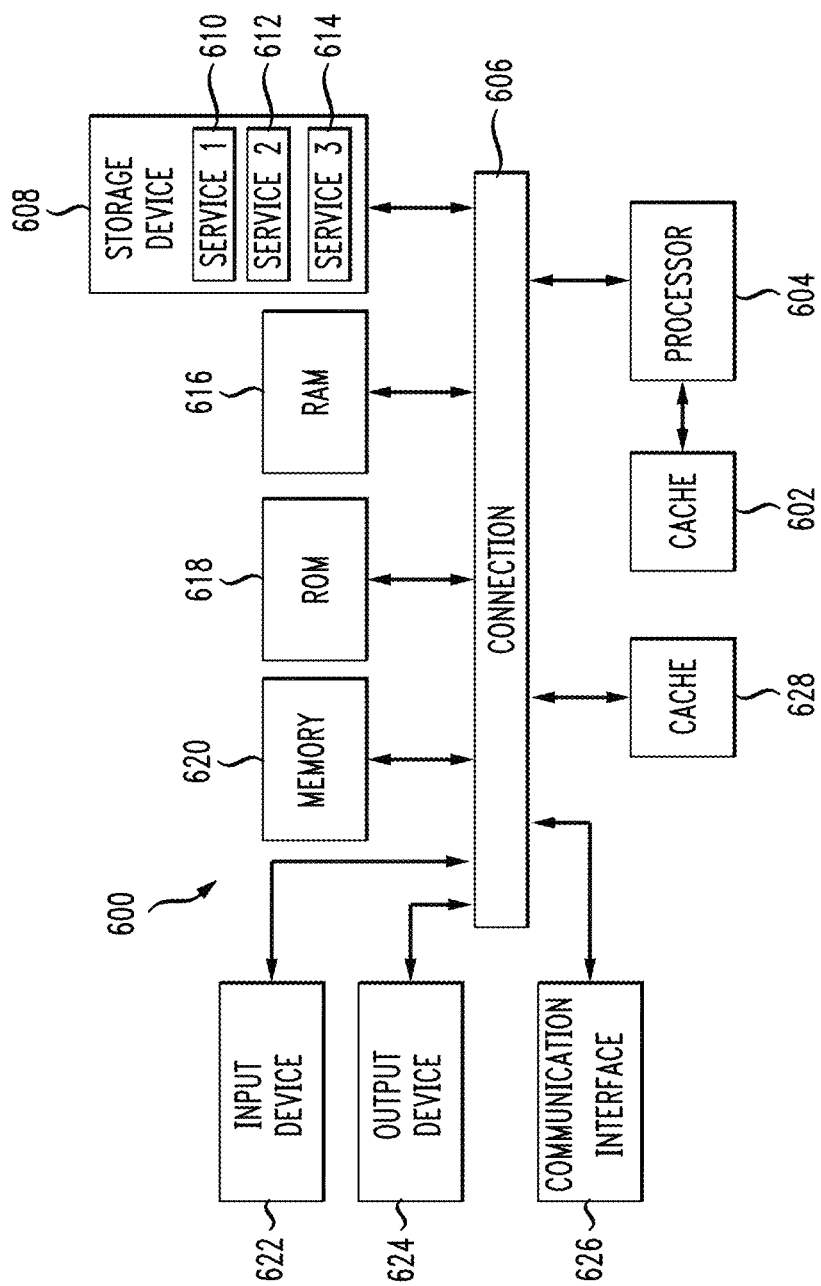
FIG. 6 illustrates an example system including various hardware computing components, according to an aspect of the present disclosure.

The disclosure now turns to FIGS. 5 and 6, which illustrate example devices. These example devices can function as any one of network components such as physical host 302 and/or 304 of FIG. 3 to enable instantiation of containers that in turn provide service functions to end client devices and perform the above described method of FIG. 4.

FIG. 5 illustrates an example network device 500 suitable for performing function routing operations, according to an aspect of the present disclosure. Network device 500 includes a master central processing unit (CPU) 504, interfaces 502, and a bus 510 (e.g., a PCI bus). When acting under the control of appropriate software or firmware, the CPU 504 is responsible for executing packet management, error detection, and/or routing functions. The CPU 504 preferably accomplishes all these functions under the control of software including an operating system and any appropriate applications software. CPU 504 may include one or more processors 508 such as a processor from the Intel X86 family of microprocessors, the Motorola family of microprocessors or the MIPS family of microprocessors. In an alternative embodiment, processor 508 is specially designed hardware for controlling the operations of network device 500. In a specific embodiment, a memory 506 (such as non-volatile RAM, a TCAM, and/or ROM) also forms part of CPU 504. However, there are many different ways in which memory could be coupled to the system.

The interfaces 502 are typically provided as modular interface cards (sometimes referred to as "line cards"). Generally, they control the sending and receiving of data packets over the network and sometimes support other peripherals used with the network device 500. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 504 to efficiently perform routing computations, network diagnostics, security functions, etc.

Although the system shown in FIG. 5 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 506) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 506 could also hold various containers and virtualized execution environments and data.

The network device 500 can also include an application-specific integrated circuit (ASIC) 512, which can be configured to perform routing and/or switching operations. The ASIC 512 can communicate with other components in the network device 500 via the bus 510, to exchange data and signals and coordinate various types of operations by the network device 500, such as routing, switching, and/or data storage operations, for example.

FIG. 6 illustrates an example system including various hardware computing components, according to an aspect of the present disclosure. The more appropriate embodiment will be apparent to those of ordinary skill in the art when practicing the present technology. Persons of ordinary skill in the art will also readily appreciate that other system embodiments are possible.

FIG. 6 illustrates a system bus computing system architecture 500 wherein the components of the system are in electrical communication with each other using a connection 506. Exemplary system 500 includes a processing unit (CPU or processor) 504 and a system connection 506 that couples various system components including the system memory 520, such as read only memory (ROM) 518 and random access memory (RAM) 516, to the processor 504. The system 500 can include a cache of high-speed memory connected directly with, in close proximity to, or integrated as part of the processor 504. The system 500 can copy data from the memory 520 and/or the storage device 508 to the cache 502 for quick access by the processor 504. In this way, the cache can provide a performance boost that avoids processor 504 delays while waiting for data. These and other modules can control or be configured to control the processor 504 to perform various actions. Other system memory 520 may be available for use as well. The memory 520 can include multiple different types of memory with different performance characteristics. The processor 504 can include any general purpose processor and a service component, such as service 1 510, service 2 512, and service 3 514 stored in storage device 508, configured to control the processor 504 as well as a special-purpose processor where software instructions are incorporated into the actual processor design. The processor 504 may essentially be a completely self-contained computing system, containing multiple cores or processors, a bus, memory controller, cache, etc. A multi-core processor may be symmetric or asymmetric.

To enable user interaction with the computing device 500, an input device 522 can represent any number of input mechanisms, such as a microphone for speech, a touch-sensitive screen for gesture or graphical input, keyboard, mouse, motion input, speech and so forth. An output device 524 can also be one or more of a number of output mechanisms known to those of skill in the art. In some instances, multimodal systems can enable a user to provide multiple types of input to communicate with the computing device 500. The communications interface 526 can generally govern and manage the user input and system output. There is no restriction on operating on any particular hardware arrangement and therefore the basic features here may easily be substituted for improved hardware or firmware arrangements as they are developed.

Storage device 508 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 516, read only memory (ROM) 518, and hybrids thereof.

The system 500 can include an integrated circuit 528, such as an application-specific integrated circuit (ASIC) configured to perform various operations. The integrated circuit 528 can be coupled with the connection 506 in order to communicate with other components in the system 500.

The storage device 508 can include software services 510, 512, 514 for controlling the processor 504. Other hardware or software modules are contemplated. The storage device 508 can be connected to the system connection 506. In one aspect, a hardware module that performs a particular function can include the software component stored in a computer-readable medium in connection with the necessary hardware components, such as the processor 504, connection 506, output device 524, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
   receiving a data packet at a corresponding container;
   determining container specific information of the corresponding container, the container specific information being unique to the corresponding container so that the corresponding container can be distinguished from other containers;
   determining physical host information corresponding to a physical host on which the corresponding container is running;
   modifying the data packet to include the physical host information;
   modifying the data packet to include the container specific information to yield a modified data packet;
   forwarding the modified data packet to a next destination based on destination information included in the data packet; and
   generating a map of a path of the data packet based on at least the container specific information;
   wherein the container specific information of the corresponding container includes a cgroup and a namespace of the corresponding container.

2. The method of claim 1, wherein the container specific information of the corresponding container includes a geo-location of the corresponding container, a cost of the container and a state of the corresponding container.

3. The method of claim 2, wherein the state of the corresponding container indicates whether the corresponding container is a passive container that is in test mode or an active container.

4. The method of claim 1, wherein the physical host information includes a node ID of the physical host, resource utilization parameters of the physical host with respect to a CPU, a memory of the physical host.

5. The method of claim 1, wherein when different containers are running on the same physical host, the container specific information includes information that distinguishes the different containers from each other.

6. A system comprising:
one or more processors; and
at least one memory configured to store computer-readable instructions, which when executed by the one or more processors, configure the one or more processors to:
receive a data packet at a corresponding container;
determine container specific n information of the corresponding container, the container specific information being unique to the corresponding container so that the corresponding container can be distinguished from other containers;
determine physical host information corresponding to a physical host on which the corresponding container is running;
modify the data packet to include the physical host information;
modify the data packet to include the container specific information to yield a modified data packet;
forward the modified data packet to a next destination based on destination information included in the data packet; and
generate a map of a path of the data packet based on at least the container specific information;
wherein the container specific information of the corresponding container includes a cgroup and a namespace of the corresponding container.

7. The system of claim 6, wherein the container specific information of the corresponding container includes a geo-location of the corresponding container, a cost of the container and a state of the corresponding container.

8. The system of claim 6, wherein the physical host information includes a node ID of the physical host, resource utilization parameters of the physical host with respect to a CPU and a memory of the physical host.

9. The system of claim 6, wherein
the system is a server on which the corresponding container is instantiated, and
the corresponding container is configured to provide a plurality of service functions over at least one server.

10. The system of claim 6, wherein a portion of a header of the data packet is modified to include the container specific information.

11. The system of claim 6, wherein when different containers are running on the same physical host, the container specific information includes information that distinguishes the different containers from each other.

12. A non-transitory computer-readable medium having computer-readable instructions, which when executed by one or more processors, cause the one or more processors to perform operations comprising:
receive a data packet at a corresponding container;
determine container specific information of the corresponding container the container specific information being unique to the corresponding container so that the corresponding container can be distinguished from other containers;
determine physical host information corresponding to a physical host on which the corresponding container is running;
modify the data packet to include the physical host information;
modify the data packet to include the container specific information to yield a modified data packet;
forward the modified data packet to a next destination based on destination information included in the data packet; and
generate a map of a path of the data packet based on at least the container specific information;
wherein the container specific information of the corresponding container includes a cgroup and a namespace of the corresponding container.

13. The non-transitory computer-readable medium of claim 12, wherein the container specific information of the corresponding container includes a geo-location of the corresponding container, a cost of the container and a state of the corresponding container.

14. The method of claim 12, the physical host information includes a node ID of the physical host, resource utilization parameters of the physical host with respect to a CPU and a memory of the physical host.

15. The media of claim 12, wherein when different containers are running on the same physical host, the container specific information includes information that distinguishes the different containers from each other.

* * * * *